United States Patent

Gersbeck et al.

[11] 3,874,962
[45] Apr. 1, 1975

[54] APPARATUS FOR THE CONTINUOUS PRODUCTION OF THIN WOOD-WOOL BOARDS

[75] Inventors: Rolf Gersbeck, Hannover; Reinhold Reschke, Misburg; Reinhold Posielsky, Langenhagen, all of Germany

[73] Assignee: Hermann Berstorff Maschinenbau GmbH, Hannover-Kleefeld, Germany

[22] Filed: May 8, 1973

[21] Appl. No.: 358,303

Related U.S. Application Data

[63] Continuation-in-part of Ser. No. 188,224, Oct. 12, 1971, abandoned.

[30] Foreign Application Priority Data

Oct. 14, 1970 Germany............................ 2050325
Mar. 27, 1971 Germany............................ 2114876

[52] U.S. Cl................ 156/62.2, 264/109, 264/113, 425/373
[51] Int. Cl........ B29j 5/00, B32b 21/02, B29d 7/14
[58] Field of Search ........... 156/62.2; 264/109, 112, 264/113; 425/83, 373

[56] References Cited
UNITED STATES PATENTS

| | | | |
|---|---|---|---|
| 2,489,079 | 11/1949 | Clark et al............................ | 425/83 |
| 3,039,137 | 6/1962 | Smith et al............................ | 425/83 |
| 3,536,549 | 10/1970 | Goerden............................ | 156/62.2 |
| 3,576,692 | 4/1971 | Hutz............................ | 156/62.2 |
| 3,649,396 | 3/1972 | Carlsson............................ | 156/62.2 |
| 3,737,351 | 6/1973 | Ettel............................ | 156/62.2 |

*Primary Examiner*—Daniel J. Fritsch
*Attorney, Agent, or Firm*—Mason, Mason and Albright

[57] ABSTRACT

The production of thin wood-wool or wood shavings boards is effected by a method carried out with the aid of a heated drum of large diameter which cooperates with one or more heated pressure rollers of relatively smaller diameter to compact wood-wool carried on an endless band to which wool and adhesive has been applied. Infra-red or other heat acts on the compacted wood-wool and the band eventually delivers the partially cured board to cutters or to another machine.

18 Claims, 2 Drawing Figures

APPARATUS FOR THE CONTINUOUS PRODUCTION OF THIN WOOD-WOOL BOARDS

RELATED APPLICATION

This is a continuation-in-part application of application Ser. No. 188,224 filed Oct. 12, 1971, now abandoned.

BACKGROUND OF THE INVENTION

1. Field of the invention

This invention relates to a method of continuously producing thin wood-wool or wood-shavings boards.

2. Description of the prior art

The production of wood-wool boards by the use of flat presses is standard practice. Here the shavings, sprayed with bonding agent, are spread on flat pressing members. Then, after preliminary compression, the shavings are pressed into board form of various thicknesses by non-continuous single or multiple presses. This method is perfectly satisfactory for making thick boards in which thickness tolerances of up to 3 mm. can be made good by abrasion. It is evident, however, that the production of thin wood-wool boards by the flat-press method cannot be economical, since the thickness tolerances must be made good by abrasion, which means that, in relation to board thickness, a large proportion of the surface of the board may have to be ground away in making good the thickness tolerance. When thin wood-wool boards are produced by such methods, the percentage of rejects is unacceptably high. That is why, hitherto, thin wood-wool boards have only very rarely been made. Boards in thicknesses of up to 8 mm. have hitherto been manufactured not as wood-wool boards, but as veneer boards or hard fibreboards. In fact, however, it is for boards in thicknesses of up to 8 mm. that there is a very large market — for door-making, in which these boards are used as underlays, and for surfacing in the furniture and packing industry.

Another serious problem with grinding to size is the abraded dust itself. Only to a certain extent is it possible for the dust to be remixed with the shavings for making boards.

Continuous methods for the production of wood-wool boards have also been proposed in which prepared shavings are pressed between two endless steel bands. In practice, however, such methods have not been satisfactory, because the two essentials for the manufacture of wood-wool boards, namely high pressure and high temperatures, cannot be provided by that means. Such continuous methods can produce eiether the requisite pressure or the requisite temperature, but it has not been possible, hitherto, to construct equipment capable of bringing about both of the conditions needed for making a good wood-wool board.

An object of the invention is therefore to produce thin wood-wool boards, simply and without rejects, for a comparatively low installation cost.

Proposals have been put forward for manufacturing plastics sheet material on apparatus which includes a heated drum, a steel tensioned band in juxtaposition to a substantial proportion of the periphery of the drum and a pressure roll which acts on the surface of the band facing away from the drum. One such apparatus is disclosed in U.S. Pat. No. 3,039,137 to M. M. Smith et al. issued June 19, 1962. This prior specification is concerned solely with the manufacture of plastics sheet materials which remain flexible after the manufacturing process has been completed. It follows that the teaching provided by Smith et al. gives no guidance for the production of thin wood-wool boards.

In another prior proposal disclosed in U.S. Pat. No. 3,212,137, to Lemettre issued Oct. 19, 1965, manufacture of sheets of plastics material is taught by means of apparatus which includes a drum, a belt of sheet steel and a pressure roller. There is, however, no reference to a method of making wood-wool boards, and the working parameters disclosed, which are suitable for plastics material would be quite unsuitable for wood-wool board manufacture.

U.S. Pat. No. 3,032,811 to Knowland et al., issued May 8, 1962, teaches a process for vulcanizing or curing elastomeric material, the process being carried out on a heated drum which cooperates with a steel pressure band and pressure rolls. Again, the parameters of temperature, pressure, drum and roll size are suited only to the curing of elastomeric sheet material and are unsuited to the manufacture of wood-wool boards.

SUMMARY OF THE INVENTION

According to the present invention, there is provided in a method of continuously producing wood-wool boards comprising the steps of depositing wood-wool and a binding agent on an endless band to form a continuously deposited layer of wood-wool impregnated with a bonding agent, pressing by means of the band the said layer against a substantial proportion of the periphery of a heated rotary drum, and applying pressure along a line transverse to the direction of motion of the layer simultaneously with said pressing, the said transverse pressure being substantially in excess of the pressure exerted on the layer by the band and drum alone, said linear pressure being exerted by a heated roller juxtaposed to the drum.

The method in accordance with the invention enables thin wood-wool boards to be produced with high accuracy, a continuous output and, provided that the rollers have a good surface finish, the board produced need not be polished prior to use.

Boards made by the method in accordance with the invention can be used for making doors and if used as a facing, the higher density boards made from fine wood-wool having a thickness not exceeding 0.2 mm. the cut edge produced is cleaner and because of good surface finish and consequent adhesion, the risk of breaking off at an edge is substantially reduced. Less dense board has the advantage that it can be shaped more readily for special purposes.

For shaped parts, such as chair seats, which are liable to high stresses, it is desirable to use at least one layer of the high density board. For other purposes where high stresses will not be encountered in use, less dense wood-wool boards will be adequate, and since these have a good resistance to bending once shaping has been completed, the inherent resilience ensures retention of the designated shape.

If required, wood-wool boards made by the method in accordance with the invention can be coated with polyvinyl chloride, paper impregnated with "Melamine" or other coverings.

BRIEF DESCRIPTION OF THE DRAWINGS

Two embodiments of apparatus for carrying out the method in accordance with the invention will now be described, by way of example, with reference to the accompanying purely diagrammatic drawings, in which.

DESCRIPTION OF THE PREFERRED EMBODIMENTS

Figure 1:
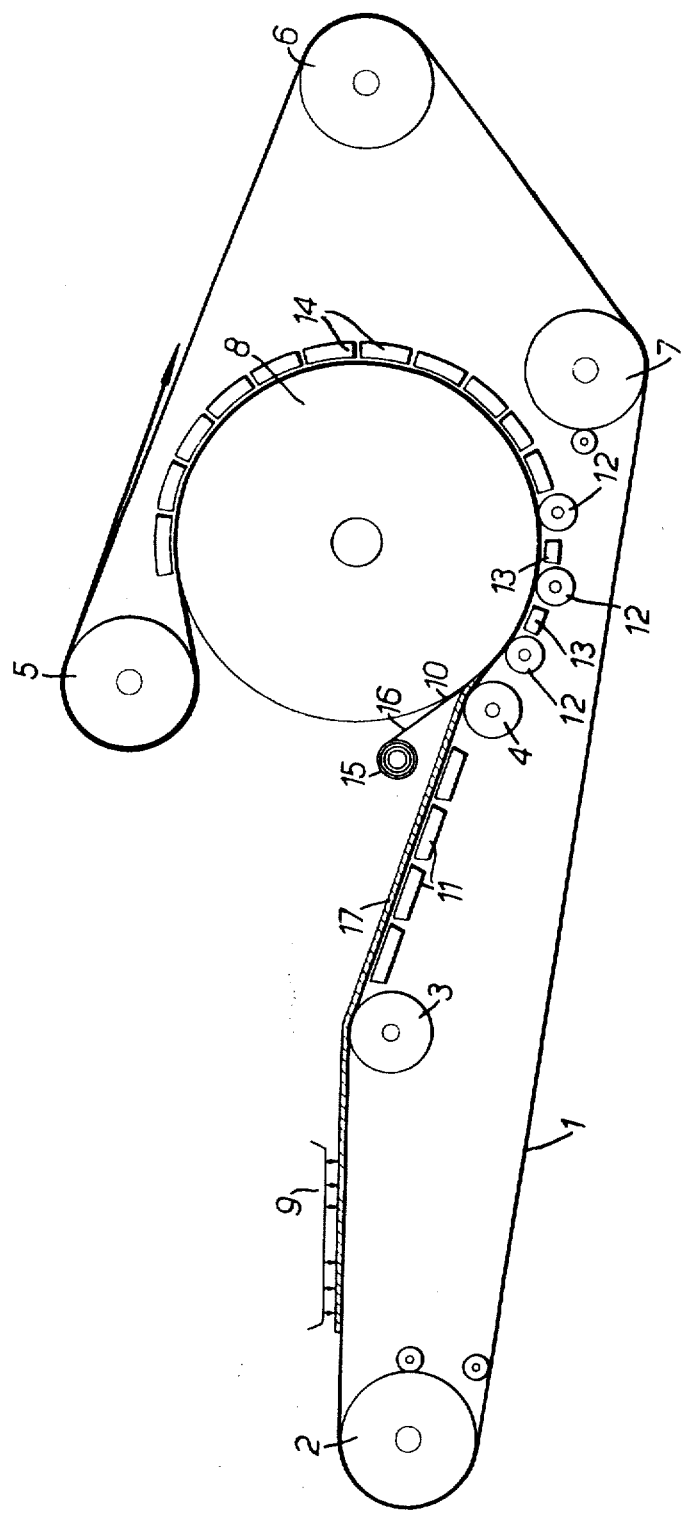
FIG. 1 is a side elevation of one embodiment.

In FIG. 1, an endless band of steel 1 having in this embodiment a length of 42 m, which runs around rollers 2, 3, 4, 5, 6 and 7 of which the roller referenced 6 acts as a tensioning roller and can accordingly be adjusted horizontally and locked in position.

The band 1 also passes round a heated rotary drum 8, which, together with the band 1, forms a press for the production of wood-wool boards. This drum 8 may be heated, for example, with steam, and in the embodiment described has a diameter of 3,000 mm. The drum may have a diameter in the range 1,500 mm to 6,000 mm. and preferably has a diameter in the range 2,400 to 4,000 mm. The rollers 2, 4, 5, 6 and 12 having a diameter of 1,400 mm. and may have a diameter in the range 900 mm. to 2,500 mm. Preferably the rollers 2, 4, 5, 6 and 12 have diameters in the range 1,100 mm. to 1,800 mm., but as will be understood the actual sizes of the drum and rollers will depend on their relative sizes.

Upstream of the line 10, where the band makes contact with the drum 8, the endless band 1 forms a working surface, on to which the wood shavings impregnated with adhesive are distributed from a scatter trolley 9.

Between the roller 3 and the line 10 at which contact is made with the drum, there is a heater 11, in the form of a plurality of infra-red radiators.

Immediately downstream of the line of contact 10 pressure rollers 12 are provided, adjustable towards the drum, between which heaters 13 are provided in the form of, for example, a plurality of infra-red radiators. Downstream of the last of the pressure rollers 12 heater means 14 are provided and likewise consist of a plurality of infra-red radiators arranged around and outwardly of the periphery of the drum 8. These heater means generate temperature in the band in the range 110°C and 130°C.

A device for facing the boards with foil 16 is also provided. This device consists of a roll of foil 15, from which the foil 16 is wound and introduced at the line of contact 10 at the gap between the drum 8 on the one side and the layer of wood shavings 17 on the other.

The mode of carrying out the method with apparatus hereinbefore described is as follows:

The wood shavings sprayed with glue or some other bonding agent are distributed evenly on the running endless band 1, between the guide rollers 2 and 3, by the scatter trolley 9. The bonding agent is preferably a duroplast consisting of glue, a hardener such as ammonium chloride, ammonia, an emulsifying agent and water. This bonding agent reacts at about 100°C. The continuously running band 1, along with the distributed sharings, is then pre-heated between the rollers 3 and 4 by the heater means 11. Preferably the wood-wool chips have a thickness of 2 mm. in an inner layer, whereas both outer layers covering this inner layer are made of wood flour. In broader terms the inner layer is made of relatively coarse chips and the outer layer is made of fine chips or flour. Prior to delivery on to the band 1 the wood-wool has a maximum moixture content of 20%.

To prevent the wood shavings from slipping down, after passing the roller 4, which has a temperature of about 180°C, into the gap between the drum 8 and the band 1, the roller 4 is set about 20°to below the preceding roller 3. The roller 4 may have a temperature in the range 120°C and 220°, preferably 160° to 200°C. The material, therefore, after passing the roller 4, is given a preliminary pressing between the drum 8 and the band 1. The rollers 2, 5 and 6 are not heated.

The drum 8 is heated by steam at about 140°C to 160°C. However, depending on the binding agent used, the thickness of board to be produced and other factors, the drum temperature may be in the range 120°C to 200°C, preferably 140°C to 160°C. The material, after its preliminary pressing between the band 1 and the drum 8, is then carried past the first pressure roller 12, where it is subjected to linear pressure. Between each of the pressure rollers 12 each maintained at approximately 180°C are the infra-red radiators 13, which ensure uniform heating of the underside of the board that is to be pressed. During its passage around the drum 8, the band 1 has a temperature in the range 110°C to 130°C, and the material of the board during its passage between the band 1 and the drum 8 has a temperature internally of about 110°C although at its outer surface the temperature may be in the range 100°C to 150° C.

To enable uniform thickness to be achieved, the gap between the pressure rollers 12 and the drum 8 can be set to a predetermined measurement. For this purpose, use may be made, for example, of hydraulic adjusters and suitable locking arrangements, which have been omitted to avoid overcrowding the drawing.

The thickness of the wood-wool board to be produced can be controlled by the thickness of shavings distributed on the band 1 and by the gap between the pressure rollers 12 and the drum 8.

By the time the material to be pressed has passed between the first pressure roller 12 and the drum 8 and been subjected to very heavy linear pressure i.e. about 400 kg/cm length of the nip and high temperature, the forces of resilience of the shavings have already been partially overcome by initial bonding. The linear pressure exerted by the roller 12 is 350 kg/cm. but may be in the range 150 kg/cm to 500 kg/cm. Then, between the line of contact between the first two pressure rollers 12 and the drum 8, the material is kept under pressure, between the drum 8 and the band 1, by the tension of the latter. The shavings can therefore no longer spring back to their original positions. A similar line pressure is exerted between the second pressure roller 12 and the drum 8, whereby once again the resilience forces in the shavings are restrained by further bonding. This process is repeated once more between the last pressure roller 12 and the drum 8. Further pressure rollers, which can be set to various distances or provided with infinite adjustment by hydraulic means, may also be included.

In this way, once the material compressed between the drum 8 and the band 1 has passed the pressure rollers 12, the resilience of the shavings has been largely overcome by bonding. As the material to be pressed continues its path round the drum 8, the wood-wool board being formed is further hardened by a uniform drum temperature and by the infra-red heaters 14.

As the pressed wood-wool board leaves the apparatus, it is led round the roller 5 and fed to further processing machinery, for example cutting machines and the like.

The band 1 can be tensioned by means of the roller 6, to bring the band up to the requisite pressure per unit surface area when passed round the drum 8. In the preferred method, during passage around the drum 8, the band 1 exerts a pressure on the drum of about 2 kg/cm². The pressure at the nip between the roller 4 and drum 8 amounts to 350 kg/cm of length. The pressure exerted by the band is in the range 1.5 kg/cm² and 2.5 kg/cm² and the linear pressure exerted at the nip between roller 4 and drum 8 is in the range 250 to 600 kg/cm. After the endless steel band has passed the tensioning roller 6, it passes again around the rollers 7 and 2, so that further shavings may be distributed on it by the scatter trolley 9 and the cycle thus recommenced.

Figure 2:
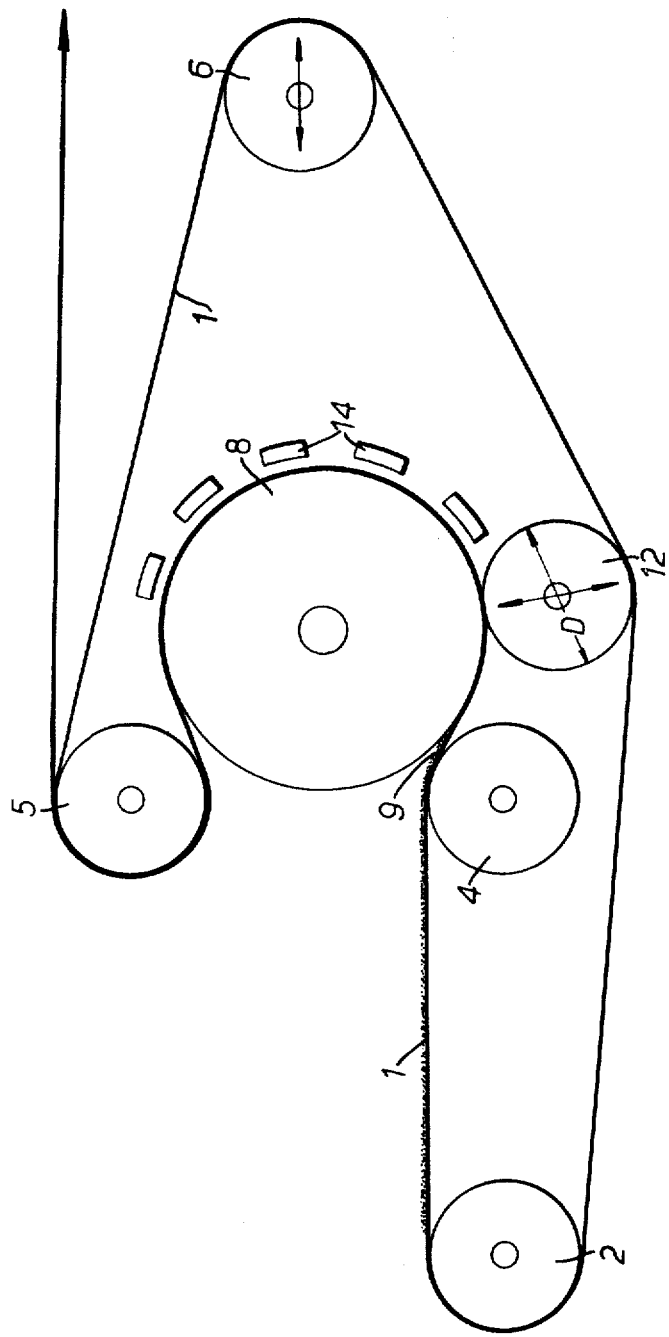
FIG. 2 is a side elevation of another embodiment.

In the embodiment of FIG. 2, only a single pressure roller 12 is provided for pressing the feed band against the drum 8. The endless band is passed around this roller 12 and it serves simultaneously as a guide roller. This saves at least one guide roller as compared to the embodiment of FIG. 1.

If it is desired to manufacture boards with a thickness not exceeding 4.00 mm., it is necessary to manufacture them from wood-wool of which the particles have a maximum thickness of 0.4 mm. Using this size of starting material the method in accordance with the invention produces a density in the finished product of from 650 to 700 kg/m³. If the particles have a maximum thickness of 0.2 mm. a density in the range 750 to 800 kg/m³. is attainable.

We claim:

1. A method continuously producing wood-wool boards with thicknesses up to 8 mm comprising the steps of
   depositing wood-wool and a binding agent on an endless band to form a continuously deposited layer of wood-wool impregnated with a bonding agent,
   preheating the underside of said band by underlying infrared heating means while said layer is traveling on said band prior to the pressing step,
   pressing by means of the band the said layer against a major proportion of the periphery of a heated rotary drum,
   applying pressure along a line transverse to the direction of motion of the layer simultaneously with said pressing, the said transverse pressure being substantially in excess of the pressure exerted on the layer by the band and drum alone, said linear pressure being exerted by a heated roller juxtaposed to the drum substantially immediately following a location proximate where said band and said drum initially come into juxtaposition, and applying heat by infrared radiation to the side of said band opposite said drum for the remaining pressing of said layer between said band and the heated periphery of said drum whereby the layer during said remaining pressing is continually heated by both the drum and the band.

2. A method according to claim 1, wherein the wood-wool is distributed on the surface of the band at a position spaced from a line at which the band and the drum initially come into juxtaposition.

3. A method according to claim 2, wherein pressure is applied to the band along a plurality of lines transverse to the direction of movement of the band and the layer, said lines of pressure being applied by heated rollers.

4. A method according to claim 3, wherein heat is supplied to the layer between at least two of the lines at which transverse pressure is applied.

5. A method according to claim 2, wherein a layer of foil is applied and bonded to one face of the layer, said foil being applied to the layer at said line and on the face of the layer directed towards the drum.

6. A method according to claim 1, wherein the wood-wool layer is formed from an inner layer of relatively coarse wood-wool particles and two outer layers of relatively fine wood-wool particles, said binding agent including a glue, a hardener and water.

7. A method according to claim 1, wherein the drum has a diameter in the range 1,500 to 6,000 mm. and said roller applying linear pressure to the wood-wool layer has a diameter in the range 900 to 2,500 mm.

8. A method according to claim 7, wherein the drum has a diameter in the range 2,400 to 4,000 mm. and said roller has a diameter in the range 1,100 to 1,800 mm.

9. A method according to claim 1, wherein the drum is heated to a temperature in the range 120°C to 200°C.

10. A method according to claim 9, wherein the drum is heated to a temperature in the range 140°C to 160°C.

11. A method according to claim 1, wherein the linear-pressure-applying roller is maintained at a temperature in the range 120°C and 220°C.

12. A method according to claim 11, wherein the said linear-pressure-applying roller has a temperature of about 180°C.

13. A method according to claim 1, wherein the band during its passage around the periphery of the drum has a temperature in the range 100°C to 150°C.

14. A method according to claim 13, wherein the band has a temperature of about 110°C.

15. A method according to claim 1, wherein the roller applying linear pressure subjects the layer of wood-wool to a pressure in the range 250 to 600 kg./cm. length measured transversely of the direction of movement of the band and the layer.

16. A method according to claim 1, wherein the pressure exerted by the band on the drum and on the layer of wood-wool is in the range 1.5 kg./cm² to 2.5 kg./cm².

17. A method according to claim 16 wherein the pressure exerted by the band on the drum is approximately 2 kg./cm².

18. A method according to claim 3, wherein the pressure exerted by said additional rollers amounts to 350 kg./cm. length.

* * * * *